United States Patent
Muelich et al.

(10) Patent No.: US 9,546,899 B2
(45) Date of Patent: Jan. 17, 2017

(54) CARRIER UNIT FOR A WEIGHT SWITCHING DEVICE AND WEIGHING CELL

(71) Applicant: Sartorius Weighing Technology GmbH, Goettingen (DE)

(72) Inventors: Sigo Muelich, Bovenden (DE); Ulrich Bajohr, Rosdorf (DE); Thomas Fehling, Witzenhausen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 426 days.

(21) Appl. No.: 14/273,973

(22) Filed: May 9, 2014

(65) Prior Publication Data
US 2014/0245809 A1   Sep. 4, 2014

Related U.S. Application Data

(63) Continuation of application No. PCT/EP2012/003954, filed on Sep. 21, 2012.

(30) Foreign Application Priority Data

Nov. 9, 2011 (DE) .................... 10 2011 055 160

(51) Int. Cl.
*G01G 21/23* (2006.01)
*G01G 21/08* (2006.01)
(Continued)

(52) U.S. Cl.
CPC .............. *G01G 21/08* (2013.01); *G01G 21/26* (2013.01); *G01G 23/01* (2013.01); *G01G 23/012* (2013.01); *Y10T 74/18856* (2015.01)

(58) Field of Classification Search
CPC ........ G01G 21/08; G01G 21/26; G01G 23/01; G01G 23/012; Y10T 74/18856
See application file for complete search history.

(56) References Cited

U.S. PATENT DOCUMENTS 2,681,222 A * 6/1954 Stelzer ...................... G01G 3/02
  177/168
3,850,023 A * 11/1974 McDonald ............. G01G 23/16
  177/1

(Continued)

FOREIGN PATENT DOCUMENTS

DE   2841996 A1   4/1980

OTHER PUBLICATIONS

International Search Report of the corresponding PCT application No. PCT/EP2012/003954, dated Mar. 13, 2013.

Primary Examiner — Randy W Gibson
(74) Attorney, Agent, or Firm — Edell, Shapiro & Finnan, LLC (57) ABSTRACT

A carrier unit for a weight switching device includes a first shift weight carrier (34-1) which moves vertically in relation to a base, for vertically mounting a first shift weight arrangement (22-1R, 22-1L) which has two spaced-apart, parallel carrier arms (30-1R, 30-1L) connected by a bridging piece (32-1). A second shift weight carrier (34-2R, 34-2L) for vertically mounting, with play, a second shift weight arrangement (22-2R, 22-2L) which likewise has two spaced-apart, parallel carrier arms (30-2R, 30-2L) connected by another bridging piece (32-2), is likewise arranged in a vertically movable manner in relation to the base. The carrier arm pair (30-1R, 30-10 of the first shift weight carrier (34-1) is arranged between and parallel to the carrier arm pair (30-2R, 30-2L) of the second shift weight carrier (34-2), and each shift weight carrier (34-1; 34-2) is articulated to a common crosspiece (12) by two parallel links (23-1R, 23-1L; 23-2R, 23-2L).

18 Claims, 3 Drawing Sheets

(51) Int. Cl.
   *G01G 21/26*      (2006.01)
   *G01G 23/01*      (2006.01)

(56) References Cited

U.S. PATENT DOCUMENTS

| | | | |
|---|---|---|---|
| 4,566,548 A | 1/1986 | Sodler et al. | |
| 4,611,676 A * | 9/1986 | Meiring | G01G 3/1414 177/145 |
| 6,864,437 B2 * | 3/2005 | Weber | G01G 21/26 177/145 |
| 7,478,551 B2 * | 1/2009 | Tellenbach | G01G 23/012 177/212 |
| 2002/0096371 A1 * | 7/2002 | Weber | G01G 23/01 177/50 |
| 2006/0196700 A1 * | 9/2006 | Genoud | G01G 23/012 177/50 |

\* cited by examiner

CARRIER UNIT FOR A WEIGHT SWITCHING DEVICE AND WEIGHING CELL

This is a Continuation of International Application PCT/EP2012/003954, with an international filing date of Sep. 21, 2012, which was published under PCT Article 21(2) in German, and the complete disclosure of which is incorporated into the present application by reference.

FIELD OF THE INVENTION

The invention relates to a carrier unit for a weight switching device of an electronic weighing cell, comprising a first shift weight carrier which is vertically movable relative to a base, for vertically mounting, with play, a first shift weight arrangement which has two parallel carrier arms spaced apart from one another and connected by a bridging piece.

The invention also relates to an electronic weighing cell, comprising
 a device base,
 an electronic weighing sensor arranged on the device base,
 a load receiver which is mechanically coupled to the weighing sensor and which supports a weighing pan holder and a shift weight receiver, and
 a weight switching device, comprising a carrier unit with shift weights and a lifting unit for loading and unloading the shift weight receiver with the shift weights as required.

BACKGROUND OF THE INVENTION

Carrier units of this type are known from JP 62027626 A and weighing cells of this type are known from DE 33 30 988 C2.

In the present context, a weight switching unit is understood to mean, in general, a device for loading and unloading a load receiver of a weighing cell as required. In particular, substitution switching and adjustment switching are known. In the latter, a distinction is often made between calibration switching and linearization switching processes. Of particular interest are automated weight switching processes, such as are used particularly in electronic weighing cells in which the load receiver, for example, a boom arm, represents the connection between a weighing pan which supports the weight to be measured and an electronic weighing sensor.

Substitution switching processes usually serve to extend the measuring range. Electric weighing sensors, in particular those which operate using the principle of electromagnetic force compensation are mostly only available in a small but very accurately digitizable measuring current range. Since the measuring current or compensation current is in direct relation to the weight force loading the weighing sensor, this leads to a correspondingly small weight measuring range. In order to be able also to measure weights below the weight measuring range thus defined, it is known to "shift" the range into the permissible weight measuring range by additional loading of the weighing sensor with known substitution weights.

When adjustment switching is performed, by contrast, known adjusting weights are measured alone in order to determine and/or set instrument parameters. Calibration is normally said to occur when device parameters are determined under full load, whilst linearization is often considered to be when, to determine a, particularly, linear characteristic, device parameters are determined at multiple load levels and then interpolated or extrapolated for further load levels.

From the aforementioned DE 33 30 988 C2, there is known an electronic weighing cell of which the load receiver connects a weighing pan with a weighing sensor operating using the electromagnetic force compensation principle. Arranged below the weighing pan at the load receiver is a shift weight receiver for receiving shift weights as required. The shift weights are part of a weight switching device which is not in direct contact with the load receiver and consists of a carrier unit and an associated lifting unit. The shift weights mounted, with vertical play, in the carrier unit can be placed onto or lifted off the shift weight receiver individually or together by a vertical movement brought about by the lifting unit in order thereby to generate different substitution or adjustment states. Associated disadvantages are, in the case of substitution, the asymmetrical loading of the load receiver which can lead to tilting and thus to measuring errors (off-center load errors) and, in the case of adjustment, the small number of different, settable adjusting states.

From JP 62027626 A mentioned in the introduction, there is known a carrier unit of a weight switching device wherein a fork-shaped shift weight carrier is pivotably mounted on a motor-driven pivot shaft at the side facing away from the free ends of the carrier arms. A ring-shaped calibration weight lies on the free ends of the carrier arms so that a center of the ring corresponds with the center of the weighing pan post of a weighing cell. By pivoting the carrier unit, the ring-shaped calibration weight can be placed onto and lifted off the load receiver carrying the weighing pan post, concentrically with said post. In principle, the ring-shaped calibration weight would also be suitable as a substitution weight. However, a disadvantage is the low number of substitution or adjustment states that can be realized.

From DE 87 15 016 U1, there is known a weighing cell in which the adjusting weights lie, in the normal position, on a shift weight storage place arranged under the weighing pan and, when needed, are lifted out by two wedges which are displaceable by horizontally pivotable levers in the intermediate space between the device bottom and the shift weights and are pressed against an upper stop. Disadvantages herein again are the small number of adjustment and substitution states that can be created and the asymmetries thereof.

From DE 28 41 996 C2, there is known a weighing cell with a plurality of substitution weights symmetrically arranged in pairs. The substitution weights hang on cams of a plurality of cam shafts arranged over one another and can be lowered and raised in pairs together or individually onto/from shift weight receivers arranged over one another. Disadvantageous herein is the significant structural space required by the weight switching device.

Finally, from DE 10 2005 033 952 B4, there is known a monolithic weight switching device, the functional details of which are not, however, disclosed in said document.

OBJECTS AND SUMMARY OF THE INVENTION

It is an object of the present invention further to develop a carrier unit of this type and an electronic weighing cell of this type such that a plurality of substitution states and adjustment states can be realized with a minimum space requirement.

This object is achieved in that a second shift weight carrier for vertically mounting, with play, a second shift weight arrangement which likewise has two parallel carrier arms spaced apart from one another and connected by a bridging piece, is likewise arranged vertically movable relative to the base, wherein the carrier arms of the first shift weight carrier are arranged between and parallel to the carrier arms of the second shift weight carrier and wherein each shift weight carrier is articulated to a common crosspiece by two parallel links which are arranged outside the two carrier arms, parallel thereto and enclosing the carrier arms between one another, and are connected to the shift weight carrier at their free ends.

The object is further achieved in that the carrier unit is configured as a carrier unit of the aforementioned type which is rigidly connected via its crosspiece to the device base, under each of the carrier arms thereof there is mounted in suspended manner and parallel to said arm a roller-shaped shift weight, and the carrier unit is arranged above the shift weight receiver, and that the lifting unit is configured for selective vertical movement of the shift weight carrier.

Preferred embodiments of the invention are also disclosed and claimed in the dependent claims.

The invention provides firstly for the carrier unit to be equipped with a second essentially identically configured shift weight carrier. This is based on the intention of increasing the number of available shift weights in order to be able to realize more adjustment states and/or substitution states. However, the invention goes beyond this starting point which is essentially known from the prior art in two particulars in order to minimize the structural space for the doubled shift weight carrier. According to the first further aspect of the invention, interleaving of the shift weight carriers in one another is provided. The second shift weight carrier encompasses, with its carrier arm pair, the first shift weight carrier. In order to achieve balanced loading of the load receiver, a particular spacing is required between the carrier arms of each shift weight carrier. The carrier arm spacing of the second shift weight carrier must only be increased slightly above the necessarily required dimension in order to create room for the first shift weight carrier in the intermediate space between the carrier arms. A second further-reaching aspect of the present invention lies in optimizing the vertical movement of each shift weight carrier.

As distinct from the generic prior art upon which the invention is based, no pivot movement is realized by the invention, but rather a purely vertical movement. The purely vertical movement permits a smaller travel overall than a pivot movement, the minimum travel of which is determined by the spacing required at the end of the carrier close to the pivot axis between the shift weight and the shift weight support, wherein the spacing at the end remote from the pivot axis is always overdimensioned. The purely vertical movement, however, reduces the vertical structural space. The purely vertical movement is achieved with the arrangement of a pair of parallel links for each shift weight carrier. The parallel links which, as a person skilled in the art would know well, comprise two parallel link levers connected to spring joints, are arranged parallel to the carrier arms and outside the two shift weight carriers which are interleaved with one another. In other words, the interleaved combination of the two shift weight carriers is bordered laterally by two parallel links in each case, of which each is connected to a carrier arm in the region of the end thereof remote from the crosspiece. The ends of the parallel links close to the crosspiece are articulated to the crosspiece and the ends of the carrier arms close to the crosspiece are not in direct contact with the crosspiece.

In the installed state within an electronic weighing cell, the shift weight carriers carry shift weights mounted hanging below and parallel to the carrier arms thereof, as is well known from the prior art. The carrier unit thus configured is fastened with the crosspiece thereof to the housing base and thus is not in direct contact with the load-dependently movable parts of the overall system, such as, in particular, the weighing pan and the load receiver. However, the carrier unit with the shift weights is positioned so that, in the lifted-off state, the shift weights hang directly above the shift weight receiver which is preferably arranged below the weighing pan. Lowering one and/or the other shift weight carrier lays the suspended shift weights into the shift weight receiver so that the load receiver is loaded with the additional weights as needed. The lifting and lowering of the shift weight carrier is carried out by a lifting unit which is suitably configured to lift and lower the first, the second or both shift weight carriers.

Using the invention, with almost the same structural space, the number of adjusting or substituting states is markedly increased without new unwanted off-center load errors necessarily arising. It is possible, in particular, to provide a weighing cell which offers to the user the possibility of adjusting, i.e. calibrating and linearizing, while simultaneously providing the possibility of substitution weighing.

In a preferred embodiment of the invention, it is provided that the carrier arms of each shift weight carrier are arranged at the same height as one another and the carrier arms of the other shift weight carriers. The carrier arms therefore lie in a common plane when in the common raised state and in the common lowered state. Only when in different lifting states do the carrier arms of the two shift weight carriers lie in offset, parallel planes. This arrangement ensures a minimum space requirement in the vertical direction.

In a development of the invention, by contrast, it is provided for the parallel links that the parallel links of each individual shift weight carrier are offset in height relative to one another. In other words, each shift weight carrier is attached to a lower-lying parallel link and to a higher-lying parallel link. The parallel links of each shift weight carrier are, particularly, spaced apart approximately along the diagonals of the shift weight carrier. This measure only appears to increase the vertical dimension. As a result of the height offset of the parallel links, the supporting link parallelogram becomes higher and therefore stiffer. If it were desired to achieve the same stiffness with parallel links arranged at the same height, the link levers thereof would each have to be spaced further apart vertically so that the stated further-reaching inventive measure leads finally to a material saving without any vertical space requirement disadvantage.

In a development of this aspect, it is provided that the parallel links arranged on one side of the shift weight carriers are offset from one another in height and, in particular, are arranged vertically over one another. This leads to a reduction in the horizontal space requirement in comparison with variants in which the parallel links, like the carrier arms, are arranged laterally adjoining one another.

In order to achieve a further saving of vertical space, in another development of the aforementioned aspect, it is provided that the parallel links of the first and second shift weight carriers are arranged in pairs at the same height. Expressed differently, the parallel links of the two shift weight carriers are diagonally interleaved. Thus, on one side of the carrier unit, the parallel link of the first shift weight carrier lies above the parallel link of the second shift weight carrier, whereas on the other side of the carrier unit, the parallel link of the second shift weight carrier lies above that of the first shift weight carrier, so that the respective upper parallel links are arranged at the same height and the respective lower parallel links are also arranged at the same height. With this mirror-symmetrical height offset of the parallel links of the two shift weight carriers, the vertical structural space is optimally used, leading to a minimum vertical space requirement and simultaneously high stiffness.

Preferably, the crosspieces, the first and second shift weight carriers and the respective associated parallel links are configured together as one piece. This prevents a loss of adjustment over the course of time. It is particularly preferred that the crosspieces, the first and second shift weight carriers and the respective associated parallel links are configured together monolithically, i.e. machined, particularly milled, from one block of material. The monolithic construction method of lever systems known, in principle, from weighing technology has the advantage, in the context of the present invention, of optimum reproducibility and parameter stability in the device.

Favorably, each shift weight carrier has a supporting projection on the crosspiece side. These supporting projections which, for space optimization, preferably project adjacent to one another into a vertically open cut-out in the crosspiece, serve as an attachment point for a lifting unit of a weighing cell containing the carrier unit according to the invention.

A motor-driven camshaft can be used, in particular, as the lifting unit, on the cams of which the supporting projections of the shift weight carrier rest. Depending on the position of the eccentric cams, which are also designated crank disks herein, different lifting states of the shift weight carriers can be realized. In order to enable very direct guidance, the supporting projections can be elastically pre-tensioned against the cams using a pre-tensioning force, for example, a spring force. Alternative embodiments of the lifting unit, for example, fashioned with pneumatic or hydraulic cylinders, with piezoelectric motors, inter alia, can also be used.

As mentioned above, it is preferably provided that a roller-shaped shift weight is mounted suspended under each carrier arm and parallel thereto. It is herein particularly preferably provided that each shift weight comprises a roller body with axial bearing posts which are formed on both sides and which lie in axially oriented, laterally chamfered guide grooves which are formed into cover plates with which bearing chambers are downwardly closed, said bearing chambers being formed in the associated carrier arm open at their ends and at their bottom sides and their end sides facing toward one another and spaced apart from one another by more than the roller body length and by less than the overall length of each shift weight. For the suspended mounting of the shift weights which must permit the vertical play that is required in order to decouple mechanically the shift weights in the state placed on the shift weight storage place from the carrier unit, an undercut structure is required which is difficult to achieve, particularly with a monolithic production method. It is therefore provided that the shift weights protrude with their bearing posts into bearing chambers of the carrier arms which are large enough to enable sufficient play (both vertically and horizontally). These chambers which are necessarily open at their end sides facing one another, through which the bearing posts of the shift weights protrude, are also downwardly open, so that the shift weights can be inserted from below. Axial insertion is not possible since the separation of the bearing chambers is too small for this. The shift weights, the roller bodies of which are too large to be able to penetrate into the bearing chamber cannot be displaced far enough in one direction axially for the bearing post to come free from the bearing chamber at the other side. However, for suspended mounting of the shift weights, the open undersides of the bearing chambers must be closed. The cover plates which have an axial, self-centering guide groove which accommodates the respective bearing post in a reproducible manner and are, for example, screwed on, serve this purpose. Therefore, despite the maintenance of the necessary play for the storage place of the shift weights, a precisely defined, reproducible position of the shift weights in the suspended state is ensured.

The exact number of adjusting and/or substitution states that can be realized depends, firstly, on the number of lifting states of the individual shift weight carriers and, secondly, on the design of the relative mechanical arrangements of the shift weight mounting and the shift weight receiver. In order to achieve the greatest possible modularity, it is preferably provided that shift weights of each individual shift weight carrier are mounted at the same height as one another, and more preferably, the shift weights of the first shift weight carrier are mounted offset in height relative to the shift weights of the second shift weight carrier. In this way, the carrier unit offers a universal starting configuration which can be used by different weighing cells through the special design of the shift weight receivers therein in order to realize the respectively required weight switching states.

In particular, it is provided in a preferred embodiment of an electronic weighing cell that the shift weight receiver and the mounting of the shift weights are height-matched to one another such that the shift weights of one shift weight carrier, when lowered evenly, load the shift weight receiver with a time offset and the shift weights of the other shift weight carrier, when lowered evenly, load the shift weight receiver simultaneously. The simultaneous placement of two shift weights, particularly symmetrically to the load conduction point of the load receiver beneath the weighing pan is particularly suitable for weight switching in the context of substitution weighing, where off-center load errors are to be avoided if possible. On weight switching in the context of an adjustment, particularly calibration or linearization, the independence of the loading with different weights is of greater significance than the off-center load error, which with always the same adjusting weight, can be calculated out with suitable adjusting routines. Thus, the shift weights placed with a time offset during even lowering of the associated shift weight carrier are preferably used as adjusting weights.

Accordingly, in a development of the electronic weighing cell according to the invention, it is further provided that a control system is actively connected to the lifting unit and is configured to use the shift weights simultaneously loading the shift weight receiver during even lowering of the associated shift weight carrier as substitution weights in the context of a substitution weighing routine and to use the shift weights loading the shift weight receiver with a time offset during even lowering of the associated shift weight carrier as calibration or linearization weights in the context of a calibration and/or linearization routine.

Further features and advantages of the invention are disclosed in the following description and the accompanying drawings.

DETAILED DESCRIPTION OF THE INVENTION

Figure 1:
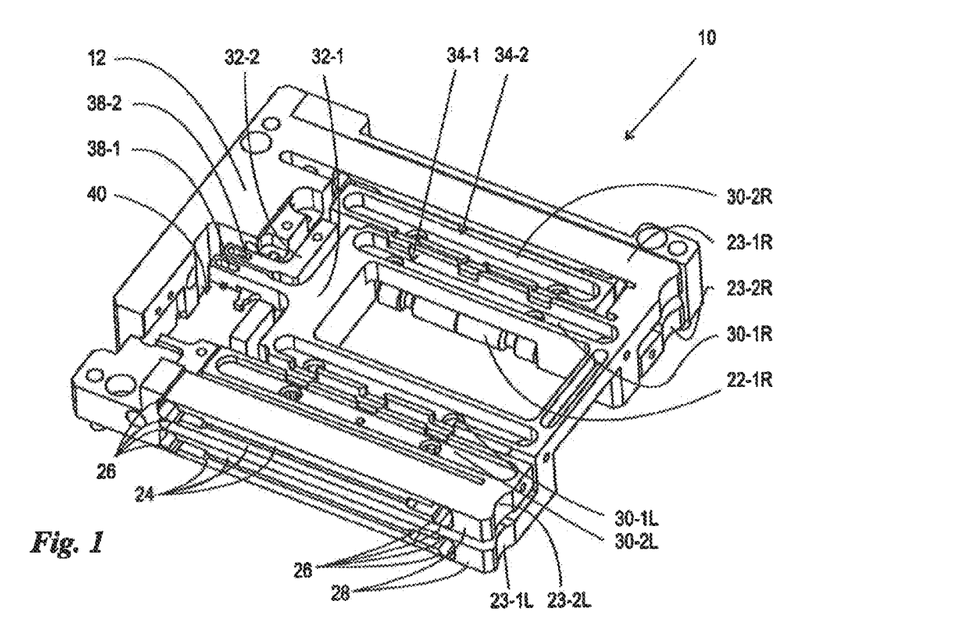
FIG. 1 shows a perspective representation of a carrier unit according to the invention with shift weights.
Figure 2:
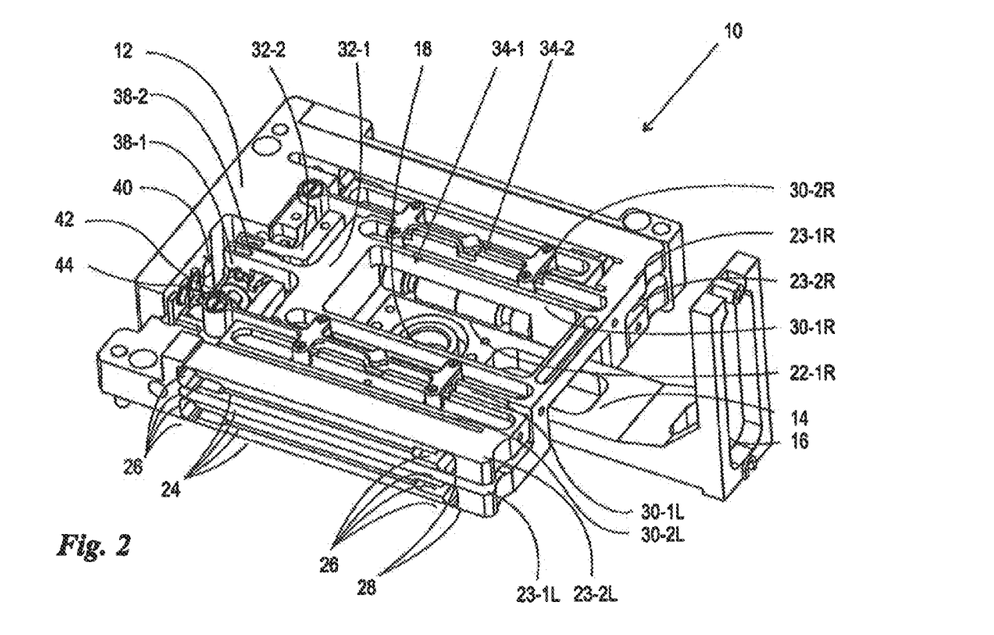
FIG. 2 shows a perspective representation of the carrier unit of FIG. 1 in the assembled position with the lifting unit and the load receiver of a weighing cell.
Figure 3:
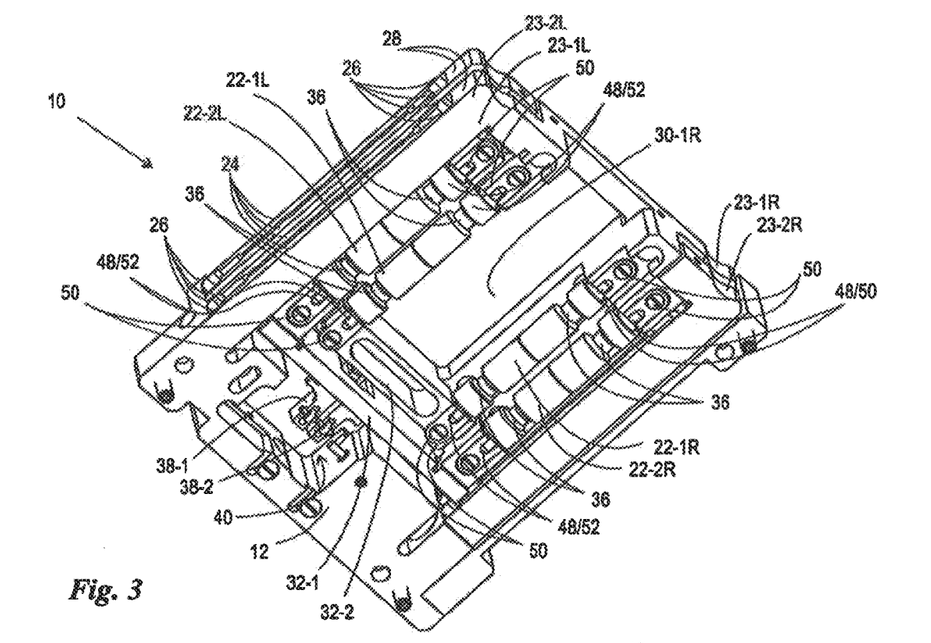
FIG. 3 shows a perspective view from below of the subject matter of FIG. 1.
Figure 4:
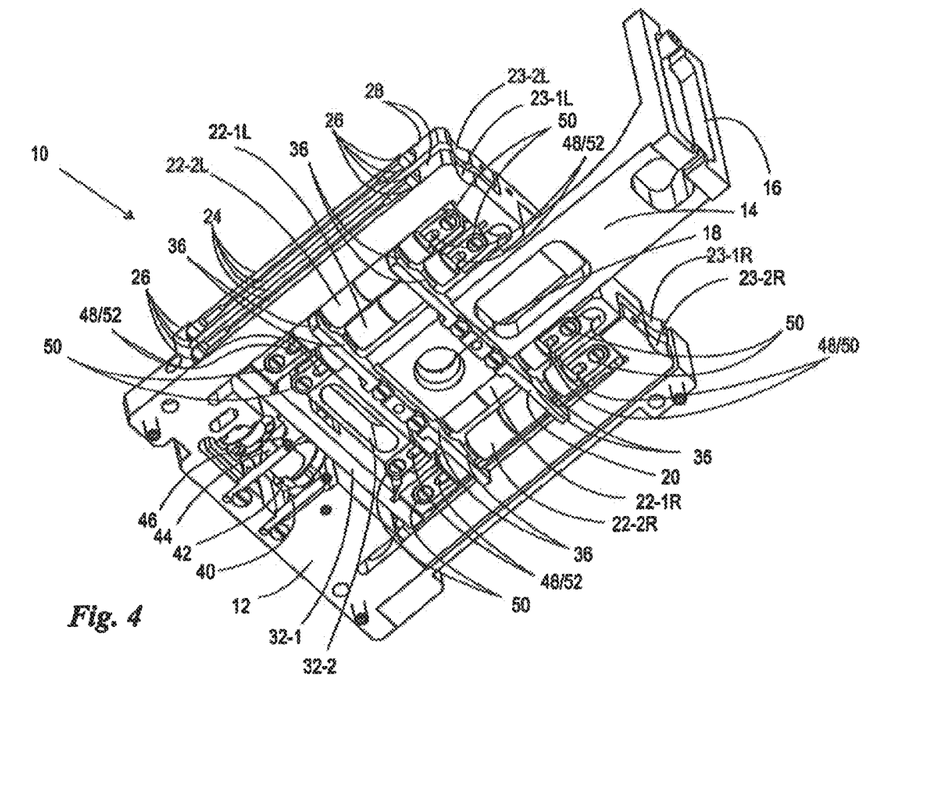
FIG. 4 shows a perspective view from below of the subject matter of FIG. 2.
Figure 5A:
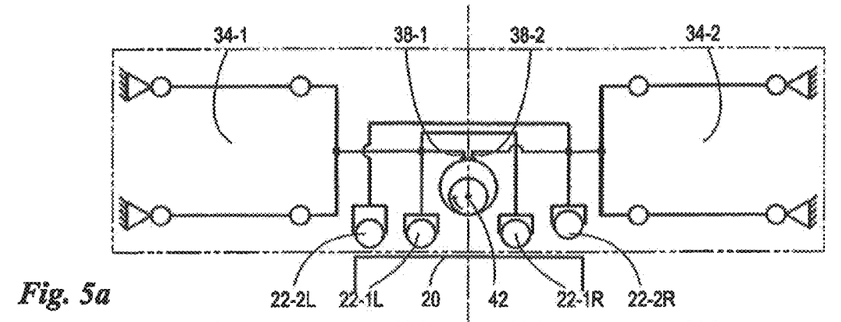
FIGS. 5a-5d show schematic sketches of the principle of different weight switching states of a weighing cell according to the invention.
Figure 5B:
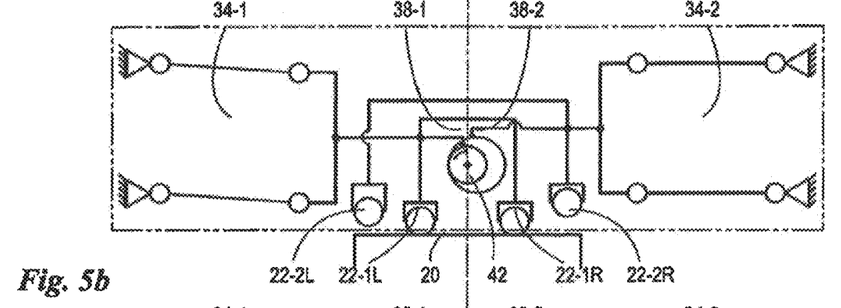
Figure 5C:
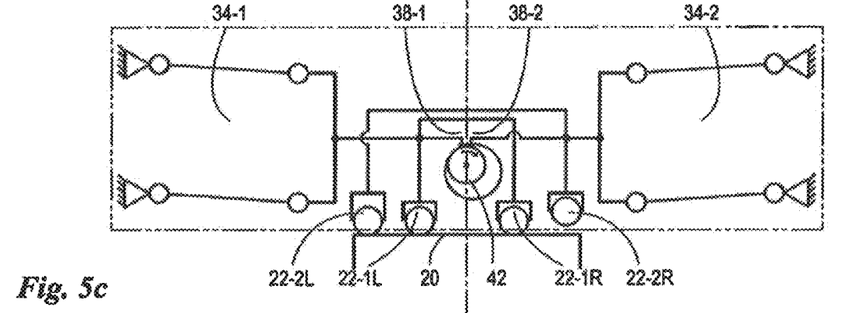
Figure 5D:
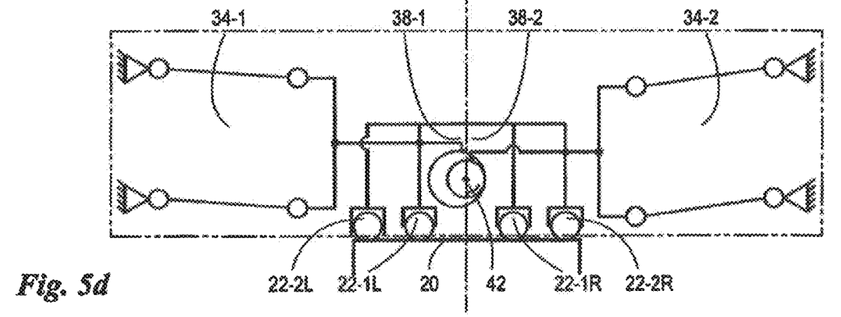

FIGS. 1 to 4 show the same preferred embodiment of the carrier unit 10 according to the invention in different views alone (FIGS. 1 and 3) and in the assembled position (FIGS. 2 and 4). FIG. 5 shows different weight switching states that can be realized with the carrier unit 10 of FIGS. 1 to 4. The same reference signs in the figures relate to the same or analogous components. Some reference signs are given in the form N-x or as N-xR or N-xL, where N is a reference sign used at another point or in isolation, x can be "1" or "2" and expresses the association with the first or second shift weight carrier, whilst "L" and "R" denote "left" or "right", making reference to FIG. 1. Where a reference sign N is used in isolation, association and orientation make no difference. FIGS. 1 to 4 will now be considered together, followed by FIG. 5.

The fixed reference element of the carrier unit 10 is the crosspiece 12. With this, the carrier unit 10 is fastened in a weighing cell to the device base thereof. The mounting takes place, as shown in FIGS. 2 and 4, directly via the cantilever 14 of a load receiver 16 configured as a boom arm. The load receiver 16 is connected by a linkage and gearing system (not shown) to a weighing sensor (also not shown). The load receiver 16 is also connected to a weighing pan (also not shown) which rests on a load post (not shown) which is fastened in a receptacle 18 in the cantilever 14 and extends vertically through the carrier unit 10. As shown, in particular, in FIG. 4, the cantilever 14 is firmly connected to a shift weight receiver 20 so that shift weights 22-1R, 22-1L, 22-2R and 22-2L mounted, with play, on the shift weight carrier can load the weighing sensor via the load receiver 16 in addition to the weight on the weighing pan when the shift weights are placed on the shift weight receiver 20. This concept is known from the prior art. It is usually the task of such carrier units, in cooperation with a lifting unit, to enable selective loading and/or unloading of the shift weight receiver 20 with the shift weights 22.

Four parallel links 23-1R, 23-1L, 23-2R and 23-2L extend horizontally perpendicularly to the crosspiece. Each of the parallel links consists of two link levers 24 which are articulated via spring joints 26, on one side, to the crosspiece 12 and, on the other side, to a head piece 28 connecting the link levers 24. The parallel link principle known from the prior art permits a purely vertical movement of an element connected to the head piece 28 with slight pivoting of the parallel link 23.

Each head piece 28 is connected to the end of one of four carrier arms 30-1R, 30-1L, 30-2R and 30-2L. The carrier arms 30 extend parallel to the parallel links 23 in the direction toward the crosspiece 12. On the crosspiece-side ends thereof, said carrier arms 30 are connected to one another in pairs, each with a bridging piece 32-1, 32-2, specifically the carrier arm 30-1R via the bridging piece 32-1 to the carrier arm 30-1L, and the carrier arm 30-2R via the bridging piece 32-2 to the carrier arm 30-2L. Thus, for each pair of carrier arms 30-1R/30-1L, 30-2R/30-2L, together with a respective bridging piece 32-1, 32-2, a shift weight carrier 34-1, 34-2 is formed which is articulated by a set of parallel links 23-1, 23-2 to the crosspiece 12.

The two shift weight carriers 34 are arranged at the same height and interleaved with one another. In particular, the first shift weight carrier 34-1 is arranged in the interior of the second shift weight carrier 34-2. This is different for the associated parallel links 23. The parallel links 23-1R and 23-1L supporting the first shift weight carrier 34-1 are arranged offset in height from one another. The same applies to the parallel links 23-2R and 22-2L supporting the second shift weight carrier 34-2. It is, in particular, clearly apparent from the drawings that the parallel links 23 arranged, in each case, on one side of the shift weight carriers 34 are arranged directly over one another. In other words, the parallel links 23 of the two shift weight carriers 34 are diagonally interleaved with one another.

A shift weight 22 is mounted suspended under each carrier arm 30. The shift weights 22 have an essentially roller-shaped body with two recesses 36 located close to the ends thereof. The recesses 36 match corresponding indentations in the shift weight receiver 20 so that the shift weights 22 can be placed into the shift weight receiver 20 substantially without axial play. In the embodiment illustrated, the shift weights 22 are suspended at the same height under the carrier arms 30. In order to achieve a time-offset loading of the shift weight receiver 20 on lowering of, in particular, the second, outer shift weight carrier 34-2, the indentations of the shift weight receiver 20 associated with the corresponding shift weights 22-2R and 22-2L are configured having different depths. In FIG. 5, which will be considered in greater detail below, the different realizable weight switching states are shown in a schematic representation. The suspension of the shift weights 22 is performed with bearing posts 48 which project on both sides axially from the end faces of the roller bodies of the shift weights 22. With these bearing posts 48, the shift weights are laid from below into open pockets of the carrier arms 30 and the pockets are closed with screwed-on cover plates 50. The cover plates 50 each have a guide groove 52 in which the bearing posts 48 rest in a self-centering manner. The bearing chambers have sufficient height to permit vertical play of the shift weights 22 so that said weights are decoupled in force-free manner from the respective shift weight carrier 34 after placement on the shift weight receiver 20.

In order to actuate the shift weight carrier 34, a lifting unit is provided in the assembled overall system, as shown in particular in FIGS. 2 and 4. A supporting projection 38-1, 38-2 which extends into a vertically open cut-out 40 in the crosspiece 12 is connected to each bridging piece 32. These supporting projections 38 rest on two link disks 42 which are mounted non-rotatably on a cam shaft 44 which is connected to the output shaft of an electric motor. A rotation of the cam shaft 44 raises and lowers the supporting projections 38 according to the shape of the crank disks 42. By this, the whole of the shift weight carriers 34 are raised and lowered and, with them, the shift weights 22. The preferred switching scheme is illustrated in schematic form in FIG. 5 which is described in greater detail below. A slotted disk 46 which is also non-rotatably connected to the cam shaft 44 serves as an optical position sensor with which the current cam shaft position is transmitted to a central control unit.

FIG. 5 shows, in four sub-diagrams, the four weight switching states which can be realized with the preferred embodiment of the present invention. The two shift weights 22-1R and 22-1L which are carried by the first, inner shift weight carrier 34-1 are suspended at the same height and the associated indentations in the shift weight receiver 20 are configured having equal depth. Thus, on lowering or raising the first shift weight carrier 34-1, the shift weights are always simultaneously set down or raised. The first shift weight carrier 34-1 preferably serves for substitution; the shift weights 22-1R and 22-1L are thus preferably substitution weights. In contrast thereto, the shift weights 22-2R and 22-2L of the second shift weight carrier 34-2 preferably serve as adjusting weights, in particular as calibration and/or linearization weights. With these weights, the weight suspension and the specific design of the shift weight receiver 20 are matched to one another such that on lowering or lifting of the second shift weight carrier 34-2, the weights are set down or raised with a time offset. Accordingly, the link disk for the second shift weight carrier 34-2 provides three different positions which are illustrated in FIGS. 5a/5b, 5c/5d. It should be noted that in the representation in FIG. 5, the shift weight receiver 20 has a uniform height so that the described time offset is achieved by suspending the shift weights 22-2R and 22-2L offset in height. In the embodiments of FIGS. 1 to 4, however, as shown in particular by FIG. 4, the shift weights 22-2R and 22-2L are arranged at the same height, whereas the corresponding indentations in the shift weight receiver 20 have different depths. Both variants are functionally equivalent and mixed variants are also conceivable.

It should be understood that the embodiments covered by the description above and shown in the figures are merely illustrative exemplary embodiments of the present invention. A broad spectrum of possible variations is self-evident to a person skilled in the art, based on the present disclosure. In particular, a person skilled in the art could adapt the particular geometry and dimensions of the individual elements to the requirements of the respective individual case. It is naturally also conceivable for the principle according to the invention to be extended with one or more shift weight carriers, shift weights or weight switching states.

REFERENCE SIGNS

10 Carrier unit
12 Crosspiece
14 Cantilever
16 Load receiver
18 Receptacle
20 Shift weight receiver
22-1R Shift weight
22-1L Shift weight
22-2R Shift weight
22-2L Shift weight
23-1R Parallel link
23-1L Parallel link
23-2R Parallel link
23-2L Parallel link
24 Link lever
26 Spring joint
28 Head piece
30-1R Carrier arm
30-1L Carrier arm
30-2R Carrier arm
30-2L Carrier arm
32-1 Bridging piece
32-2 Bridging piece
34-1 First shift weight carrier
34-2 Second shift weight carrier
36 Recess
38-1 Supporting projection
38-2 Supporting projection
40 Vertical cut-out in 12
42 Crank disk
44 Cam shaft
46 Position sensor
48 Bearing post
50 Cover plate
52 Guide groove

What is claimed is:

1. A carrier unit for a weight switching device of an electronic weighing cell, comprising:
a first shift weight carrier (34-1) vertically movable relative to a base, and vertically mounting, with play, a first shift weight arrangement (22-1R, 22-1L), which has two parallel carrier arms (30-1R, 30-1L) spaced apart from one another and connected by a bridging piece (32-1),
a second shift weight carrier (34-2R, 34-2L) vertically mounting, with play, a second shift weight arrangement (22-2R, 22-2L) which has two further parallel carrier arms (30-2R, 30-2L) spaced apart from one another and connected by a further bridging piece (32-2), and likewise arranged vertically movable relative to the base,
wherein the carrier arms (30-1R, 30-1L) of the first shift weight carrier (34-1) are arranged between and parallel to the carrier arms (30-2R, 30-2L) of the second shift weight carrier (34-2) and
wherein each shift weight carrier (34-1; 34-2) is articulated to a common crosspiece (12) by two parallel links (23-1R, 23-1L; 23-2R, 23-2L) which are arranged outside the two carrier arm pairs (30-1R, 30-1L; 30-2R, 30-2L), parallel to and enclosing the carrier arms between the parallel links, and are respectively connected to the first and the second shift weight carriers at respective free ends of the first and the second shift weight carriers.

2. The carrier unit as claimed in claim 1, wherein the carrier arms (30-1R, 30-1L; 30-2R, 30-2L) of each of the first and the second shift weight carriers (34-1, 34-2) are arranged at a single height.

3. The carrier unit as claimed in claim 1, wherein the parallel links (23-1R, 23-1L; 23-2R, 23-2L) of each of the first and second shift weight carriers (34-1; 34-2) are arranged offset in height relative to one another.

4. The carrier unit as claimed in claim 3, wherein the parallel links (23-1R, 23-1L; 23-2R, 23-2L) respectively arranged on one respective side of the shift weight carriers (34-1; 34-2) are arranged offset in height relative to one another.

5. The carrier unit as claimed in claim 4, wherein the parallel links (23-1R, 23-1L; 23-2R, 23-2L) respectively arranged on one respective side of the shift weight carriers (34-1; 34-2) are arranged vertically over one another.

6. The carrier unit as claimed in claim 4, wherein the parallel links (23-1R, 23-1L; 23-2R, 23-2L) of the first and second shift weight carriers (34-1; 34-2) are arranged in pairs at a single height.

7. The carrier unit as claimed in claim 1, wherein the crosspieces (12), the first and second shift weight carriers (34-1; 34-2) and the respective associated parallel links (23-1R, 23-1L; 23-2R, 23-2L) form a single integral piece.

8. The carrier unit as claimed in claim 7, wherein the crosspieces (12), the first and second shift weight carriers (34-1; 34-2) and the respective associated parallel links (23-1R, 23-1L; 23-2R, 23-2L) are constructed together monolithically.

9. The carrier unit as claimed in claim 1, wherein each shift weight carrier (34-1; 34-2) has a supporting projection (38-1; 38-2) on a side facing the crosspiece.

10. The carrier unit as claimed in claim 9, wherein the supporting projections (38-1; 38-2) project adjacent to one another into a vertically open cut-out (40) in the crosspiece (12).

11. The carrier unit as claimed in claim 1, wherein roller-shaped shift weights (22-1R, 22-1L; 22-2R, 22-2L) are mounted suspended respectively under and parallel to each carrier arm (30-1R, 30-1L; 30-2R, 30-2L).

12. The carrier unit as claimed in claim 11, wherein each shift weight (22-1R, 22-1L; 22-2R, 22-2L) comprises a roller body with axial bearing posts (48) which are formed thereon on both sides and which lie in axially oriented, laterally chamfered guide grooves (52) which are formed into cover plates (50) with which bearing chambers are downwardly closed, wherein the bearing chambers are formed into the associated carrier arm (30-1R, 30-1L; 30-2R, 30-2L) open at their ends and at their bottom sides and at their end sides facing toward one another, and wherein the bearing chambers are spaced apart from one another by more than the roller body length and by less than an overall length of each shift weight (22-1R, 22-1L; 22-2R, 22-2L).

13. The carrier unit as claimed in claim 11, wherein the shift weights (22-1R, 22-1L; 22-2R, 22-2L) of each of the first and second shift weight carriers (34-1; 34-2) are mounted at the same height as one another.

14. The carrier unit as claimed in claim 11, wherein the shift weights (22-1R, 22-1L) of the first shift weight carrier (34-1) are mounted offset in height relative to the shift weights (22-2R, 22-2L) of the second shift weight carrier (34-2).

15. An electronic weighing cell, comprising
a device base,
an electronic weighing sensor arranged on the device base,
a load receiver (16) which is mechanically coupled to the weighting sensor and which supports a weighing pan holder and a shift weight receiver (20), and
a weight switching device comprising a carrier unit (10) with shift weights (22-1R, 22-1L; 22-2R, 22-2L) and a lifting unit (42, 44, 46) configured to load and unload the shift weight receiver (20) with the shift weights (22-1R, 22-1L; 22-2R, 22-2L), and
a carrier unit (10) as claimed in claim 1, which is rigidly connected via the crosspiece (12) thereof to the device base,
wherein each shift weight carrier (34-1; 34-2) has a supporting projection (38-1; 38-2) on a side facing the crosspiece,
wherein the carrier unit is arranged above the shift weight receiver (20), and
wherein the lifting unit (42, 44, 46) is configured for selective vertical movement of the shift weight carrier (34-1, 34-2).

16. The electronic weighing cell as claimed in claim 15, wherein:
each shift weight carrier (34-1; 34-2) has a supporting projection (38-1; 38-2) on a side facing the crosspiece,
the supporting projections (38-1; 38-2) project adjacent to one another into a vertically open cut-out (40) in the crosspiece (12), and
the lifting unit (42, 44, 46) comprises a motor-driven cam shaft (44) on the crank disk (42) of which the supporting projections (38-1; 38-2) of the shift weight carrier (34-1; 34-2) rest.

17. The electronic weighing cell as claimed in claim 15, wherein the shift weight receiver (20) and the mounting of the shift weights (22-1R, 22-1L; 22-2R, 22-2L) are height-matched to one another such that the shift weights (22-2R, 22-2L) of one shift weight carrier (34-2), when lowered evenly, load the shift weight receiver (20) with a time offset and the shift weights (22-1R, 22-1L) of the other shift weight carrier (34-1), when lowered evenly, load the shift weight receiver (20) simultaneously.

18. The electronic weighing cell as claimed in claim 17, wherein the electronic weighing cell further comprises a control system which is actively connected to the lifting unit (42, 44, 46) and is configured
to use the shift weights (22-1R, 22-1L) simultaneously loading the shift weight receiver (20) during even lowering of the associated shift weight carrier (34-1) as substitution weights in a substitution weighing routine, and
to use the shift weights (22-2R, 22-2L) loading the shift weight receiver (20) with a time offset during even lowering of the associated shift weight carrier (34-2) as calibration or linearization weights in at least one of a calibration and a linearization routine.

* * * * *